United States Patent
Serov et al.

(10) Patent No.: US 9,728,788 B2
(45) Date of Patent: Aug. 8, 2017

(54) MECHANOCHEMICAL SYNTHESIS FOR PREPARATION OF NON-PGM ELECTROCATALYSTS

(71) Applicants: Alexey Serov, Albuquerque, NM (US); Plamen B Atanassov, Santa Fe, NM (US)

(72) Inventors: Alexey Serov, Albuquerque, NM (US); Plamen B Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/647,466

(22) PCT Filed: Nov. 27, 2013

(86) PCT No.: PCT/US2013/072196
§ 371 (c)(1),
(2) Date: May 27, 2015

(87) PCT Pub. No.: WO2014/085563
PCT Pub. Date: Jun. 5, 2014

(65) Prior Publication Data
US 2015/0318557 A1    Nov. 5, 2015

Related U.S. Application Data (60) Provisional application No. 61/730,162, filed on Nov. 27, 2012.

(51) Int. Cl.
*H01M 4/86*      (2006.01)
*H01M 4/90*      (2006.01)
*H01M 4/96*      (2006.01)
*B01J 37/08*     (2006.01)
*B01J 23/745*    (2006.01)

(52) U.S. Cl.
CPC ........ *H01M 4/8605* (2013.01); *B01J 23/745* (2013.01); *B01J 37/08* (2013.01); *H01M 4/8652* (2013.01); *H01M 4/9083* (2013.01); *H01M 4/96* (2013.01)

(58) Field of Classification Search
CPC .......... B01J 23/745; B01J 27/24; B01J 37/08; H01M 4/8605; H01M 4/96; H01M 4/9083
USPC ........................................ 502/162, 185, 200
See application file for complete search history.

(56) References Cited

U.S. PATENT DOCUMENTS

| | | | |
|---|---|---|---|
| 9,180,443 B1* | 11/2015 | Serov | B01J 37/0018 |
| 2008/0312073 A1* | 12/2008 | Olson | B01J 31/06 502/164 |
| 2011/0287174 A1* | 11/2011 | Calabrese Barton | H01M 4/8807 427/115 |
| 2014/0349843 A1* | 11/2014 | Patterson | H01M 4/9041 502/182 |
| 2015/0263353 A1* | 9/2015 | Serov | H01M 4/9091 502/159 |
| 2015/0295248 A1* | 10/2015 | Serov | H01M 4/90 502/159 |
| 2015/0357652 A1* | 12/2015 | Serov | H01M 4/9091 502/174 |

(Continued)

*Primary Examiner* — Patricia L Hailey
(74) *Attorney, Agent, or Firm* — Gonzales Patent Services; Ellen M. Gonzales (57) ABSTRACT

A method for preparing M-N—C catalytic material utilizing ball-milling with or without the addition of a sacrificial support.

21 Claims, 6 Drawing Sheets

(56) References Cited

U.S. PATENT DOCUMENTS

2015/0380741 A1* 12/2015 Serov .................... H01M 4/925
                                                        429/524

\* cited by examiner

MECHANOCHEMICAL SYNTHESIS FOR PREPARATION OF NON-PGM ELECTROCATALYSTS

CROSS-REFERENCE TO RELATED APPLICATIONS

The following application claims benefit of U.S. Provisional Application No. 61/730,162, filed Nov. 27, 2012 which is hereby incorporated by reference in its entirety.

STATEMENT REGARDING GOVERNMENT SPONSORED RESEARCH

This invention was made with Government support under Grant No. awarded by the DOE-EERE Fuel Cell Technology Program. The U.S. Government has certain rights in this invention.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Nobel metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

Generally, known non-platinum electrocatalysts are supported on high surface area carbon blacks. This is done to increase dispersion, active surface area, and conductivity of the catalytic layer. The synthesis procedure usually includes precipitation of the precursor molecules onto the supporting substrate and pyrolysis of the supported precursor.

Metal-Nitrogen-Carbon (M-N—C) catalysts have been found to be very promising for electrochemical oxygen reduction applications in fuel cell membrane electrode assemblies (MEAs), stacks and fuel cell systems. Critical aspects of the materials include the presence of metallic particles, conjugated carbon-nitrogen-oxide-metallic networks, and nitrogen-bonded carbon. The metallic phase includes metallic, oxide, carbide, nitride, and mixtures of these states. The chemical states and bonding of the N/C/M networks and N/C networks influences performance, for example, increased overall nitrogen content improves ORR performance. However, these systems still suffer from several significant drawbacks including: low stability in acidic environments, low durability in acid and alkaline environments, high costs of nitrogen precursors and low activity in ORR compared with platinum. The problem of low stability in acid is connected to leaching of metal from carbon-nitrogen network. Low durability in acid and alkaline solutions is explained by the evolution of significant amount of $H_2O_2$ in these environments which is corrosive for both metal and carbon-nitrogen networks. The low activity is possibly due to the low metal loading, and as a result in low concentration of active sites in such catalysts due to using external carbon source (high surface carbons like Vulcan, KetjenBlack etc).

Despite the fact that there are several companies working on commercialization of M-N—C catalysts [32-34], the majority of non-PGM catalysts are being synthesized in the researcher's labs in sub-grams amounts. Furthermore, typical synthesis methods usually utilize solvent-based wet impregnation of a carbon support with precursors of a transition metal and a nitrogen-carbon source (complex-forming or chelating agent, polymer precursors or polymers). The estimation of the amount of solvent used for preparation of one kilogram of M-N—C catalysts by the method described is on the order of 200-300 liters, introducing the problem of waste management. In addition to this, some amount of the solvents may stay as a residue during the pyrolysis steps and, thus, contribute to the variability of the synthesis outcome. Furthermore, solvent-based methods necessarily require that the materials used be soluble, preventing the production and development of M-N—C catalysts formed from non-soluble materials.

SUMMARY

In the present disclosure a novel solvent-free mechanochemical synthesis-based method for preparing non-platinum group metal (PGM) catalytic materials and materials formed using such methods are described. The method enables, for example, the preparation of a variety of catalytic materials, including but not limited to, catalytic materials formed from insoluble materials. The method employs ball-milling and may or may not utilize a sacrificial support.

DETAILED DESCRIPTION

According to an embodiment, the present disclosure provides a novel solvent-free or reduced-solvent mechanosynthesis-based method of preparation of non-platinum group metal (non-PGM) catalytic materials which enables, for example, the preparation of a variety of materials including, but not limited to, catalytic materials formed from insoluble materials. The method employs ball-milling and may or may not utilize a support, which may or may not be sacrificial. Of course it will be appreciated that while the method does not require the addition of solvents, solvents may be used, if desired.

Ball-milling has been described previously in referenced to M-N—C catalyst material synthesis as a method for filling the pores of a carbon support with a pore-filler. See e.g., Jaouen et al. [44]. However, in the methods described in the present disclosure, ball-milling is used to enable mechanosynthesis, alleviating the need for solvent-based preparation methods. For the purposes of the present disclosure, the term "ball mill" is used to refer to any type of grinder or mill that uses a grinding media such as silica abrasive or edged parts such as burrs to grind materials into fine powders and/or introduce to the system enough energy to start a solid state chemical reaction that leads to the formation of a catalyst. In general, for the purposes of the present disclosure, the ball mill used should be capable of producing enough energy to initiate the desired chemical reaction or achieve the desired level of mixing.

For the sake of clarity, in the present application the term "catalyst" is used to refer to a final product, suitable for use, for example, in a fuel cell, which has catalytic activity. The catalyst may include multiple types of materials, some of which may not in themselves have catalytic activity (for example, supporting material.) The term "catalytic material" is any material which has catalytic activity either on its own or as part of a catalyst.

In general, the presently described methods utilize the energy produced by ball-milling of the various precursor materials to drive a chemical reaction between the precursors. According to a more specific example, a catalytic material according to the present disclosure may be synthesized by ball milling metal, nitrogen, and carbon, (M-N—C) precursors under sufficient conditions to initiate a chemical reaction between the various precursors. The M-N—C polymer is then subjected to heat treatment, (such as pyrolysis) in an inert ($N_2$, Ar, He, etc.) or reactive ($NH_3$, acetonitrile, etc.) atmosphere at a sufficient temperature to produce a catalytic material. According to some embodiments, the entire process is performed dry, by which is meant, without the presence of any added solvents. According to one embodiment of a solvent-free process, all reactants (i.e. precursors) are combined in a ball mill in powder form and the entire process is conducted without the addition of any liquids. For the purposes of the present disclosure, a powder is a dry, bulk solid composed of a large number of very fine particles that may flow freely when shaken or tilted.

Because the method can be practiced without the presence of any solvents, the method enables the synthesis of catalysts formed from insoluble materials. Examples of insoluble materials which can be used to form catalysts according to the present disclosure include, but are not limited to urea-melamine-formaldehyde polymer, melamine, Metal Organic Frameworks (MOFs), polyacrylonitrile etc.

Exemplary characteristics which may be examined with regard to the selection of nitrogen, carbon, or nitrogen-carbon precursors used for producing catalytic materials as described herein include, but are not limited to: (1) carbon richness; (2) nitrogen richness; and (3) thermal stability, i.e. the volatility of the molecules and resistance to decomposition due to heating. The degree of carbon richness is related to the porosity of the final product. For example, according to some embodiments, a porous, open-frame matrix will be formed if each molecule of the carbon precursor contains, on average, at least 5 carbon atoms. Depending on whether the plan is to perform synthesis in an inert or nitrogen-rich environment, the nitrogen richness of the precursor may need to be taken into account. For example, if synthesis is to be performed in an inert atmosphere, the precursor must have a substantial amount of nitrogen, since all the M-$N_x$ centers must be formed from nitrogen contained in the precursor itself. Finally, precursors should be chosen which will remain stable under the thermal conditions to be used. For example, if the methodology to be used requires pyrolysis at a temperature of above 700° C. (a minimum temperature frequently required for active-site formation), it is important that the precursor remain stable at temperatures above 700° C. An exemplary N—C precursor that exhibits each of these characteristics (high carbon richness, nitrogen richness and thermal stability) is 4,4'-Methylenediantipyrine (DAAPyr). DAAPyr contains 22 carbon atoms, which is sufficient for building a 3D carbon network, and four nitrogen atoms per molecule, which provides sufficient nitrogen for populating the resulting catalytic material with metal-$N_x$ active sites when synthesis is performed in an inert atmosphere. DAAPyr also has a $T_{dec}$>160° C., which is sufficiently high to withstand high temperature pyrolysis and where $T_{dec}$ is the thermal decomposition temperature which is the temperature where a compound decomposes in a specific atmosphere. Other examples include, but are not limited to Phenanthroline, Aminoantypirin, Polyaniline and other N—C precursors.

According to some embodiments, the metal precursors may be one or more precursors of one or more transition metals, including, but not limited to iron and iron-containing alloys or mixtures. Examples of suitable iron precursors include, but are not limited to, iron nitrate, iron sulfate, iron acetate, iron chloride, etc. Examples of other transition metals include, but are not necessarily limited to Ce, Cr, Cu Mo, Ni, Ru, Ta, Ti, V, W, and Zr, which can be substituted in the described methods in place of iron, by simply using precursors of those metals instead. Exemplary transition metal precursors include, but are not limited to cerium nitrate, chromium nitrate, copper nitrate, ammonium molybdate, nickel nitrate, ruthenium chloride, tantalum isopropoxide, titanium ethoxide, vanadium sulfate, ammonium tunstanate and zirconium nitrate. It will be understood that according to some embodiments the presently described methodologies may utilize precursors of two or more metals to produce multi-metallic catalysts.

It will be appreciated that the present disclosure often makes reference to "M-N—C precursors." It should be understood that such terminology is used to refer to any single or group of precursors which, taken as a whole, contain suitable metal, nitrogen, and carbon atoms which are available for chemical synthesis. Accordingly, an "M-N—C precursor" may refer to a metal-nitrogen-and-carbon-containing precursor; or to a metal-containing precursor and a nitrogen-and-carbon-containing precursor; or a metal-and-nitrogen-containing precursor and a carbon-containing precursor; or a metal-and-carbon-containing precursor and a nitrogen-containing precursor; or a metal-containing precursor, a nitrogen-containing precursor, and carbon-containing precursor, so long as the metal, nitrogen, and carbon, are available for chemical synthesis.

For the purposes of the present disclosure, the term "precursor" is used to refer to a compound which participates in a chemical reaction by contributing one or more atoms to a compound that is formed as the product of the chemical reaction or otherwise contributes to the formation of the product. For example in generating a gaseous product that creates a small pore or void in the final product or in helping create the chemical structure of the final product as in the case of nickel nanoparticles leading to the growth of carbon fibers.

According to some embodiments the M-N—C precursors are ball-milled in the presence of supporting material so as to enable infusion of the M-N—C precursors on, around, and throughout (if the supporting material is porous) the supporting material. Examples of suitable supporting materials include, but are not limited to carbon blacks, carbon nanotubes, conductive oxides or nitrides such as Indium Tin oxide or Molybdenum Nitride etc. According to some embodiments the supporting material may be a sacrificial support. For the purposes of the present disclosure, the term "sacrificial support" is intended to mean a material which is used during the synthesis process to provide a temporary structural support, but which is mostly or entirely removed during the synthesis step.

It will be appreciated that the supporting material, whether sacrificial or not, may be synthesized and infused in a single synthesis step or the supporting material may be synthesized first (or otherwise obtained) and then infused with the M-N—C precursors. The infused supporting material is then subjected to heat treatment, (such as pyrolysis) in an inert ($N_2$, Ar, He, etc.) or reactive ($NH_3$, acetonitrile, etc.) atmosphere.

Of course it will be appreciated that given the high temperatures that the supporting material will be subjected to during the synthesis method, it may be desirable to select a supporting material that will not negatively affect the catalytic materials under the specific synthesis conditions used. Accordingly, it will be appreciated that silica is a preferred material for a sacrificial support used under some of the conditions described herein, but that other suitable materials may be used. Other suitable sacrificial supports include, but are not limited to zeolites, aluminas, and the like.

The support, sacrificial or otherwise, may take the form of spheres, particles, or other two- or three- dimensional regular, irregular, or amorphous shapes. The spheres, particles, or other shapes may be monodisperse, or irregularly sized. The spheres, particles, or other shapes may or may not have pores and such pores may be of the same or different sizes and shapes.

It should be appreciated that the size and shape of the sacrificial particles may be selected according to the desired shape(s) and size(s) of the voids within the electrocatalyst material. Accordingly, by selecting the particular size and shape of silica particles for the sacrificial support, one can produce an electrocatalyst having voids of a predictable size and shape. For example, if the silica particles are spheres, the electrocatalyst will contain a plurality of spherical voids. Those of skill in the art will be familiar with the electrocatalyst Pt—Ru black, which consists of a plurality of platinum-ruthenium alloy spheres. An electrocatalyst formed using silica spheres with the above-described method looks like a negative image of the Pt—Ru black; the space that existed as a void in the Pt—Ru black is filled with metal electrocatalyst, and the space that existed as metal electrocatalyst in the Pt—Ru black is void.

As stated above, according to some embodiments, particulate supports of any diameter may be used. In some preferred embodiments, particles having a characteristic length of between 1 nm and 100 nm, in more preferred embodiments, particles having characteristic lengths of between 100 nm and 1000 nm may be used and in other preferred embodiments, particles having characteristic lengths of between 1 mm and 10 mm may be used. Further mesoporous supports can also be used in the synthesis approach. In this case the templating involves intercalating the mesopores of the material and in the case of a sacrificial support, results in a self-supported electrocatalysts with porosity in the 2-20 nm range.

In one particular embodiment, the sacrificial template is Cabosil amorphous fumed silica (325 $m^2$/g). As stated above, because the spheres serve as the template for the formation of the electrocatalyst, in an embodiment where silica particles having an average diameter of 20 nm is used, the spherical voids in the electrocatalyst will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

As stated above, after deposition and/or impregnation of the M-N—C precursors on the support, the material is heat treated either in an inert atmosphere such as $N_2$, Ar, or He, or in a reactive atmosphere such as $NH_3$ or acetonitrile. Inert atmospheres are typically used when the infused materials are nitrogen rich, as the inert atmosphere enables the production of a high number of active sites with Fe (or other metal) N4 centers. However, it may be desired to use a nitrogen rich atmosphere if infused material is rich in carbon and depleted in nitrogen, as the nitrogen rich atmosphere will enable production of the Fe (or other metal) N4 centers. As described in greater detail in the experimental section below, according to some preferred embodiments, the materials of the present are subjected to heat treatment in a reactive atmosphere.

According to some embodiments, particularly embodiments wherein a single step synthesis method is used, optimal temperatures for heat treatment are typically between 500° C. and 1100° C. According to some embodiments, heat treatment may preferably be between 750° C. and 900° C., or more preferably between 775° C. and 825° C. In some embodiments, heat treatment of around 800° C. is preferred, as our experimental data showed this temperature to produce catalysts having a high amount of catalytic activity for certain specific materials (see experimental section below).

After heat treatment, the sacrificial support, if used, is removed using suitable means. For example, the sacrificial support may be removed via chemical etching. Examples of suitable etchants include NaOH, KOH, and HF. According to some embodiments, it may be preferable to use KOH, as it preserves all metal and metal oxide in the catalyst and, if the species are catalytically active, use of KOH may, in fact, increase catalytic activity. Alternatively, in some embodiments, HF may be preferred as it is very aggressive and can be used to remove some poisonous species from the surface of the catalyst. Accordingly, those of skill in the art will be able to select the desired etchants based on the particular requirements of the specific catalytic material being formed.

According to some embodiments, the presently described catalytic materials can also be synthesized using a double heat-treatment procedure. In this procedure, after polymerization, whether or not a sacrificial support is used, the polymerized and polymerizing M-N—C precursors are subjected to a first heat treatment step, such as pyrolysis in order to produce an intermediate material that is rich with unreacted metal. The intermediate material is then subjected to a second heat treatment step, which may be, for example, a second pyrolysis treatment, resulting in newly formed active sites. If a sacrificial support is used, the sacrificial support is typically removed after the first heat treatment and before the second heat treatment, using chemical etching or other suitable means as described above.

In embodiments utilizing two separate heat treatment steps, it may desirable for the different heat treatment steps to be conducted under different conditions, for example at different temperatures and/or for different durations of time. For example, the first heat treatment step may be performed at a higher temperature, such as 800° C. for 1 hr and the second heat treatment step may be performed at a temperature between 800 and 1000° C. for a period of time between 10 minutes and 1 hour.

It will be appreciated that some in some applications a mono-metallic catalyst may not be sufficiently stable or active to replace traditional platinum- or platinum alloy-based catalysts. Accordingly, as indicated above, according to some embodiments, the presently described method may incorporate the use of precursors of multiple metals in order to achieve a desired stability and/or activity.

According to some embodiments, it may be desirable to produce large amounts of the catalysts described herein, for example in a batch-wise process. Accordingly, the present disclosure further provides a method for large-scale preparation of the presently described catalysts. According to an embodiment, the present disclosure provides a method which combines a sacrificial support-based methodology with spray pyrolysis to produce self-supported catalysts. According to this method, the spray pyrolysis method is a continuous method while the sacrificial support-based methodology is performed batch-wise. According to an exemplary method, the M-N—C precursor materials described herein are mixed with a silica support, atomized, and dried in a tube furnace. The powder obtained from this procedure is then collected on a filter. The collected powder is then heat treated. Finally, the sacrificial support is removed, for example by leaching with HF or KOH.

It will be appreciated that the above-described large-scale production method is suitable for use for a wide variety of precursors and materials and thus not necessarily limited to the catalysts disclosed herein.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

REFERENCES

[33] M. H. Robson, A. Serov, K. Artyushkova, P. Atanassov Electrochim Acta, 90 (2013) 656-665
[34] S. Brocato, A. Serov, P. Atanassov Electrochim. Acta, 87 (2013) 361-365
[35] A. Serov, M. H. Robson, K. Artyushkova, P. Atanassov Appl. Catal. B 127 (2012) 300-306.
[36] A. Serov, M. H. Robson, M. Smolnik, P. Atanassov Electrochim Acta 80 (2012) 213-218.
[37] A. Serov, U. Martinez, A. Falase, P. Atanassov Electrochem. Comm. 22 (2012) 193-196.
[38] A. Serov, M. H. Robson, B. Halevi, K. Artyushkova, P. Atanassov Electrochem. Comm. 22 (2012) 53-56.
[39] A. Falase, M. Main, K. Garcia, A. Serov, C. Lau, Plamen Atanassov, Electrochim Acta 66 (2012) 295-301.
[40] A. Serov, U. Martinez, P. Atanassov Electrochem. Comm. 34 (2013) 185-188.
[41] A. Serov, M. H. Robson, M. Smolnik, P. Atanassov, Electrochim Acta 109 (2013) 433-439.

Additional information may be gathered from the Examples section below. The reaction tests shown and described in the drawings and in the following examples clearly demonstrate that catalysts prepared using the method described possess high Oxygen Reduction activity in acid media. Further, the mechanism of oxygen reduction shows the direct reduction of oxygen to water by a 4 electron pathway, preventing corrosive peroxide production and therefore improving stability and durability of catalysts. Thus, catalysts of the composition and using the preparation method described herein, including but not limited to the described materials shown herein, are effective catalysts for oxygen reduction.

EXPERIMENTAL DATA

Example I

Synthesis of Fe-Methylenediantipyrine (Fe-DAAPyr) Cathode Catalysts Using Mechanochemical Synthesis and Sacrificial Supports (Soluble Precursor Utilizing Sacrificial Support)

Fe-DAAPyr catalysts were prepared by the combination of mechanochemical synthesis and sacrificial supports. First, a calculated amount of silica (Cab-O-Sil® M5P), Methylenediantipyrine (4-4-Methylenediantipyrine, Sigma-Aldrich) and iron nitrate (Fe(NO3)3*9H2O, Sigma-Aldrich) were premixed in a 250 ml glass beaker. The mixture was then placed into 50 ml agate ball-mill jar with agate balls. The mass ratio of mixture:balls was ~1:1. The powder was then ball-milled at 500 RPMs for 4 h. The ball-milling parameters were: balls diameter—5 mm, mass ratio of precursors to balls—1:1. The ball-milled fine mixture was then subjected to pyrolysis in three different gases: UHP nitrogen, 50 at %. H2 and 5 at %. NH3 (flow rate 100 cc min-1), 20 deg min-1 temperature ramp rate with different pyrolysis time. The experimental variable component of HT temperatures was of 900° C., 950° C. and 1000° C. After heat treatment, the silica was leached away by means of 25 wt. % HF overnight. Finally, Fe-DAAPyr was washed with DI water until neutral pH and dried at T=85° C.

Figure 1:
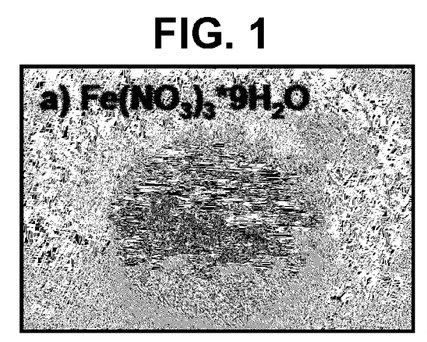
FIG. 1 is an image of $Fe(NO_3)_3*9H_2O$ precursors.
Figure 2:
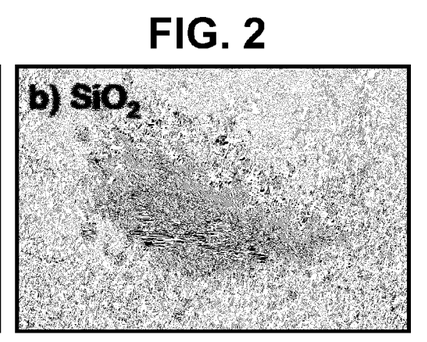
FIG. 2 is an image of $SiO_2$.
Figure 3:
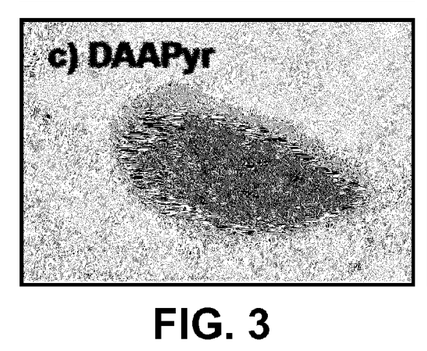
FIG. 3 is an image of DAAPyr.
Figure 4:
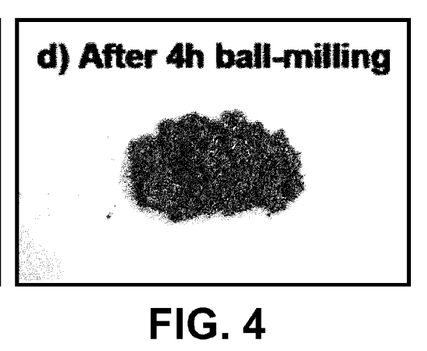
FIG. 4 is an image of the precursors and materials of FIGS. 1-3 after they have been ball-milled together for 4 hours.

The ball-milling of a slightly colored initial mixture of precursors (FIGS. 1 and 3) with a sacrificial support (FIG. 2) results in the formation of a bright reddish brown material (FIGS. 4). The change in color seen in FIG. 4 confirms that the mechanical energy introduced by the balls is high enough to initiate a chemical reaction between iron nitrate and methylenediantipyrine.

Figure 5:
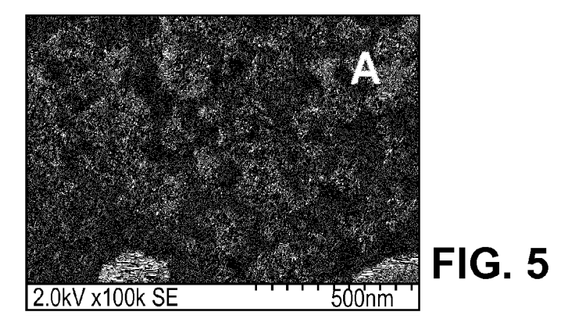
FIG. 5 is an SEM image of Fe-DAAPyr materials after heat treatment at 900° C. for 1 hour in an $N_2$ atsmophere showing the highly porous components.
Figure 6:
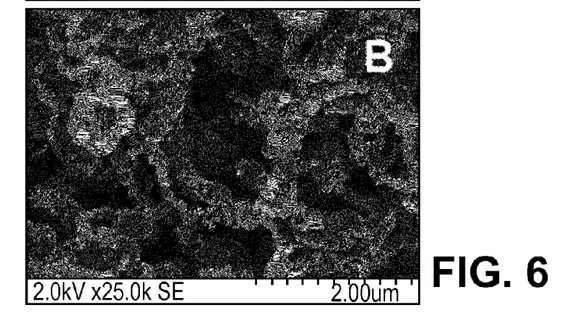
FIG. 6 is an SEM image of Fe-DAAPyr materials after heat treatment at 900° C. for 1 hour in an $N_2$ atsmophere showing the grapheme-like component.
Figure 7:
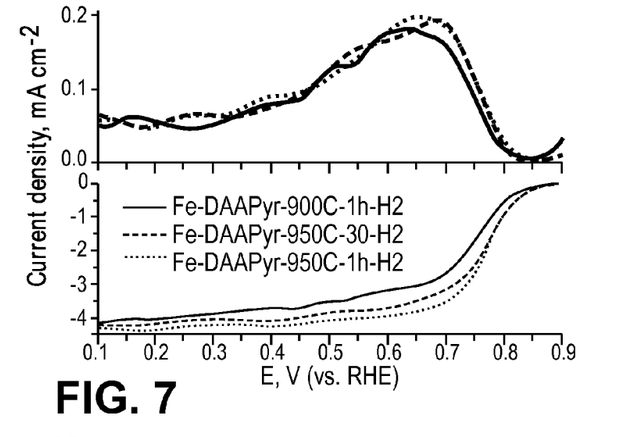
FIG. 7 shows RRDE data for Fe-DAAPyr catalysts heat-treated at different conditions in $H_2$ atmosphere using 0.5 M $H_2SO_4$ saturated with $O_2$, 1200 RPM, 5 mV s$^{-1}$, catalyst loading 0.6 mg cm$^{-2}$.
Figure 8:
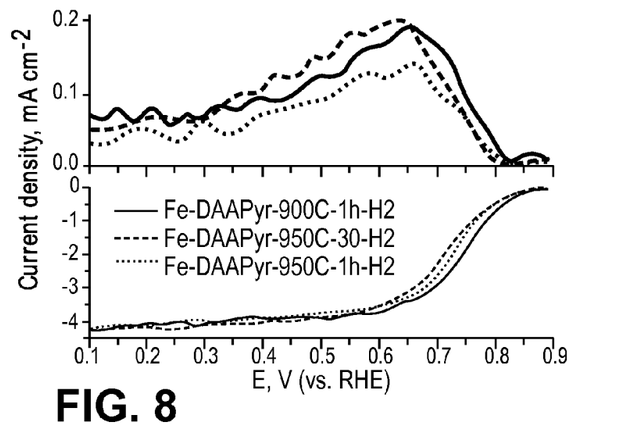
FIG. 8 shows RRDE data for Fe-DAAPyr catalysts heat-treated at different conditions in $N_2$ atmosphere in $H_2$ atmosphere using 0.5 M $H_2SO_4$ saturated with $O_2$, 1200 RPM, 5 mV s$^{-1}$, catalyst loading 0.6 mg cm$^{-2}$.
Figure 9:
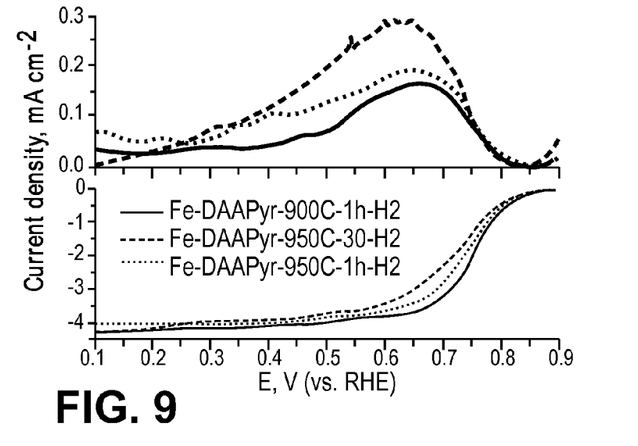
FIG. 9 shows RRDE data for Fe-DAAPyr catalysts heat-treated at different conditions in $NH_3$ atmosphere in $H_2$ atmosphere using 0.5 M $H_2SO_4$ saturated with $O_2$, 1200 RPM, 5 mV s$^{-1}$, catalyst loading 0.6 mg cm$^{-2}$.

Morphological analysis of Fe-DAAPyr samples pyrolyzed in various atmospheres shows the presence of several types of pores (FIGS. 5 and 6). Large pores are formed during leaching of silica agglomerates, whereas small pores are formed by the gas released from organic precursor. In general, materials pyrolyzed in ammonia and hydrogen had a similar morphology while materials pyrolyzed in a nitrogen-rich atmosphere promoted the formation of graphene-like structures (FIG. 6). It should be stressed that in contrast to conventional synthetic methods, using the sacrificial supports eliminates the requirement of carbon supports and successfully produces a 3-dimensional porous open-frame structure. The catalytic material formed during the thermal decomposition of the Fe-DAAPyr composite consists of substantial amounts of carbon derived from only the organic part of the precursor. Moreover, our data shows that the elimination of inactive artificially added carbon from the synthesis steps results in the increase of the density of active sites.

Figure 10:
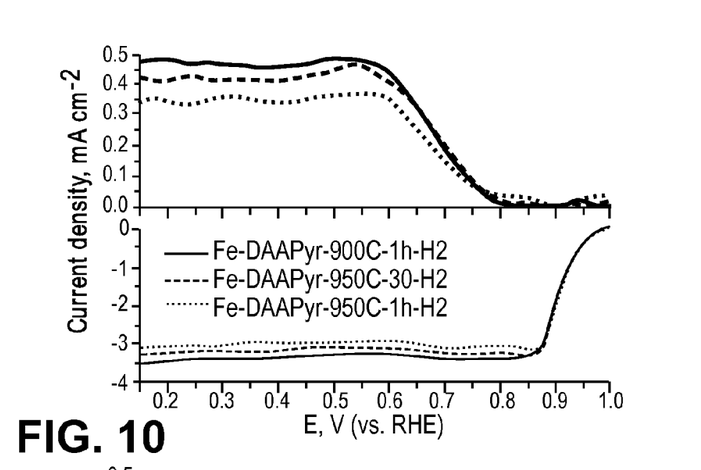
FIG. 10 shows RRDE data for Fe-DAAPyr catalysts heat-treated at different conditions in $H_2$ atmosphere using 1 M KOH saturated with $O_2$, 1200 RPM, 5 mV s$^{-1}$, catalyst loading 0.6 mg cm$^{-2}$.
Figure 11:
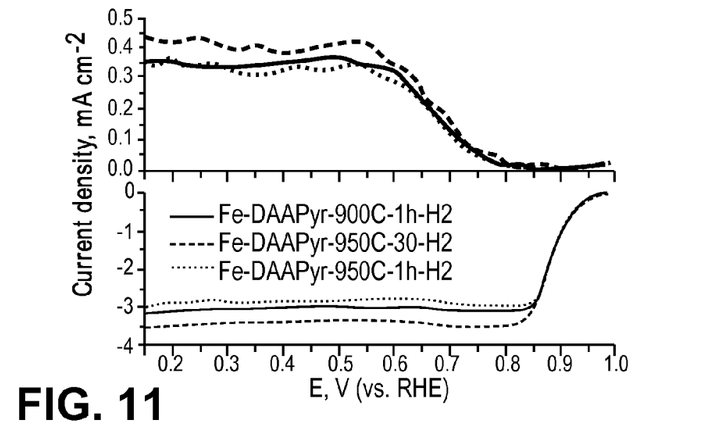
FIG. 11 shows RRDE data for Fe-DAAPyr catalysts heat-treated at different conditions in $N_2$ atmosphere using 1 M KOH saturated with $O_2$, 1200 RPM, 5 mV s$^{-1}$, catalyst loading 0.6 mg cm$^{-2}$.
Figure 12:
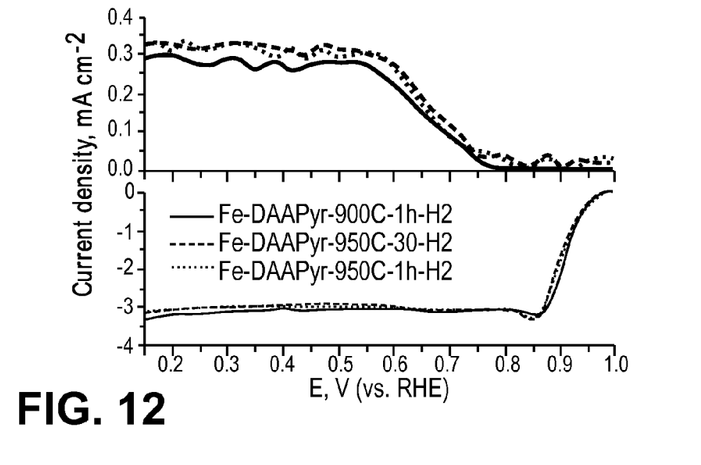
FIG. 12 shows RRDE data for Fe-DAAPyr catalysts heat-treated at different conditions in $NH_3$ atmosphere using 1 M KOH saturated with $O_2$, 1200 RPM, 5 mV s$^{-1}$, catalyst loading 0.6 mg cm$^{-2}$.

The influence of heat treatment parameters and pyrolysis atmosphere on ORR activity in acid media is shown FIGS. 7-12. It was observed that in the case of a reductive atmosphere (hydrogen), the most active material was prepared at a higher temperature. Compare, for example, Fe-DAAPyr-N$_2$ and Fe-DAAPyr-NH$_3$ samples (950° C. vs 900° C., respectively). Surprisingly, the catalytic activity in alkaline media depended neither on heat treatment time-temperature nor the choice of atmosphere (FIG. 10-12). Up to our best knowledge, this is the first observation of such behavior among M-N—C catalysts. The difference in ORR activity in acid vs alkaline media can be related to two phenomena: a different ORR mechanism and/or the accessibility of active sites. To address this, our analysis of hydrogen peroxide yield was performed at reduced loading of materials (1=0.1 mg cm$^{-2}$).

XPS spectra were acquired on a Kratos Axis Ultra DLD X-ray photoelectron spectrometer using an Al Kα source monochromatic operating at 150 W with no charge compensation. Survey and high-resolution spectra were acquired at pass energies of 80 eV and 20 eV respectively. Data analysis and quantification were performed using CasaXPS software. Sensitivity factors provided by the manufacturer were utilized. A 70% Gaussian/30% Lorentzian line shape was utilized in the curve-fit of N 1 s.

Figure 13:
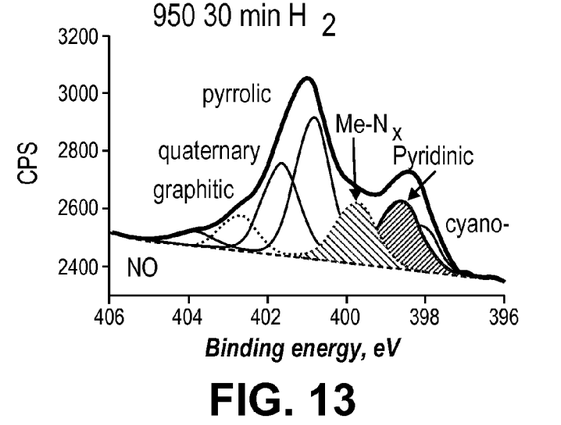
FIG. 13 is N is high resolution spectra for the best performing samples in both acid and alkaline media.
Figure 14:
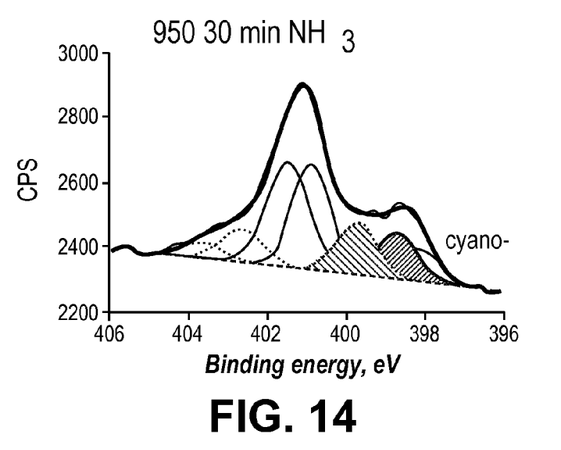
FIG. 14 is N is high resolution spectra for the worst performing samples in acid media.
Figure 15:
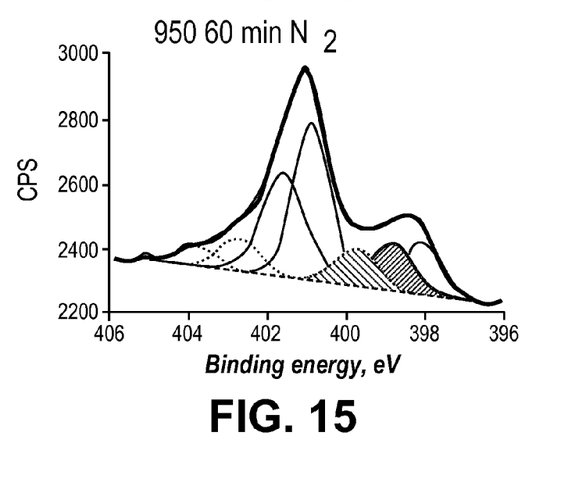
FIG. 15 is N is high resolution spectra for the worst performing samples in alkaline media.
Figure 16:
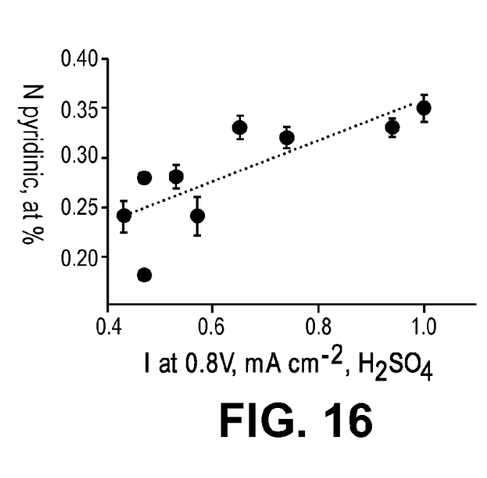
FIG. 16 shows the correlation between surface speciation and current density for 0.8 V for at % N pyridinic in acid media.
Figure 17:
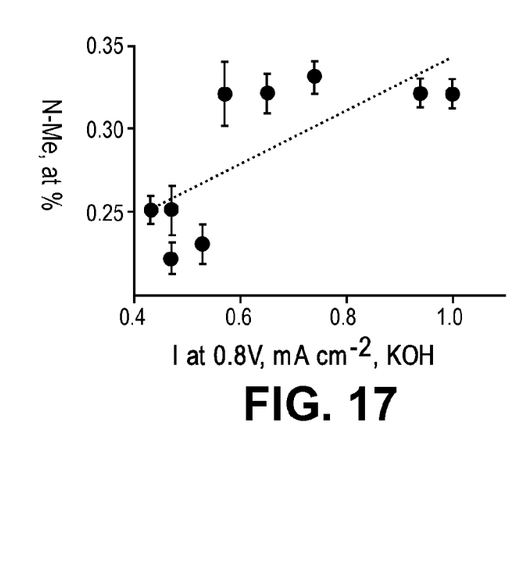
FIG. 17 shows the correlation between surface speciation and current density for at % Me—Nx in acid media

Detailed XPS analysis of all 9 samples (3 different temperatures for each of three different atmospheres) allows correlation of the surface composition with ORR activity in both acidic and alkaline environments. The surface concentration of oxygen increased at higher temperatures and longer times of heat-treatment. At the same time, the amount of nitrogen systematically decreased with an increase of heat-time integral under conditions of oxidative N$_2$ and NH$_3$ treatments, while surface nitrogen-containing species were preserved under the reductive atmosphere of H$_2$. High resolution nitrogen spectra were curve fitted using peaks assigned to moieties typically present in such types of M-N—C materials, i.e. to nitrile (398.0 eV), pyridinic nitrogen (398.6 eV), pyrrolic nitrogen (400.7 eV), quaternary nitrogen (401.5 eV), graphitic nitrogen (403 eV), N-O species (405-407 eV) and nitrogen coordinated to iron at 399.6 eV. FIG. 4 shows N is high resolution spectra for the best performing sample in acid and alkaline (950° C. for 30 minutes in $H_2$) and worst performing samples in acid and alkaline (950° C. for 30 minutes in $NH_3$ and 950° C. for 60 minutes in $N_2$, respectively As one can see from the high resolution spectra shown in FIG. 13-15, the best sample treated under reductive atmosphere have largest peaks due to pyridinic N and N coordinated to Fe. Sample treated under oxidative atmosphere of ammonia results in larger relative amount of quaternary N with respect to N pyridinic and Fe—$N_x$, and this causes the loss of its activity in acid media. The sample treated under oxidative atmosphere of nitrogen has much larger amount of pyrrolic N with respect to N pyridinic and Fe—$N_x$ moieties which causes the loss of activity in alkaline media.

Electrochemical analysis for synthesized catalysts was performed using the Pine Instrument Company electrochemical analysis system. The rotational speed reported was 1200 RPM, with a scan rate of 5 mV sec$^{-1}$. The electrolytes were 0.5 M $H_2SO_4$ or 1 M KOH saturated in 02 at room temperature. A platinum wire counter electrodes and Ag/AgCl (sulfuric acid electrolyte) or Hg/HgO (potassium hydroxide electrolyte) reference electrodes were used.

Working electrodes were prepared by mixing 5 mg of the Fe-DAAPyr electrocatalyst with 850 μL of isopropyl alcohol, and 150 μL of Nafion® (0.5% wt., DuPont). The mixture was sonicated before 30 μL was applied onto a glassy carbon disk with a sectional area of 0.2474 cm2. The loading of catalyst on the electrode was 0.6 mg cm-2.

Figure 18:
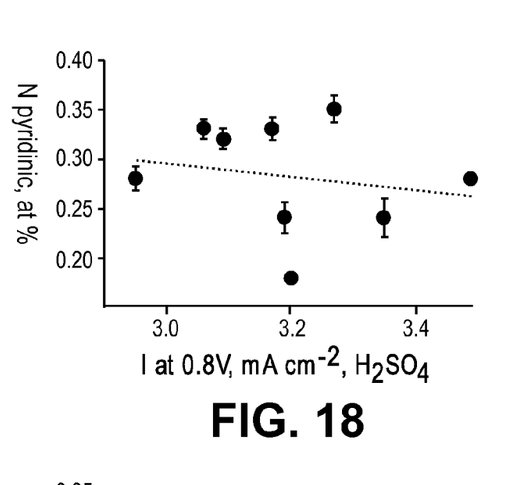
FIG. 18 shows the correlation between surface speciation and current density for 0.8 V for at % N pyridinic in alkaline media.
Figure 19:
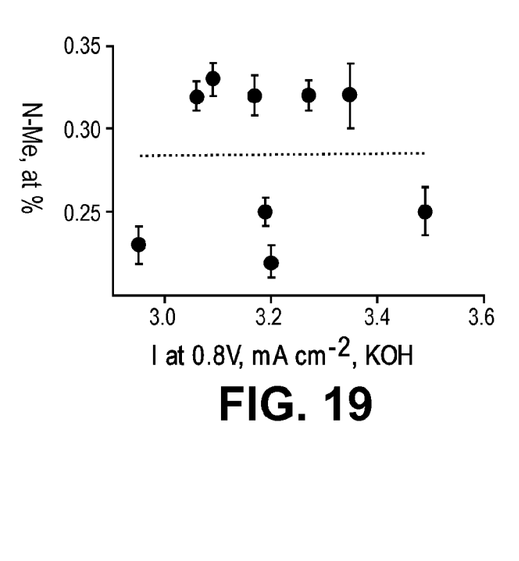
FIG. 19 shows the correlation between surface speciation and current density for at % Me-$N_x$ in alkaline media.

FIGS. 16-19 plot atomic percentage of noteworthy surface species, i.e. N pyridinic and Fe—$N_x$, as a function of current density at 0.8 V for both acidic and alkaline media. In acidic media, we have confirmed that an increase of pyridinic nitrogen (FIG. 16) as well as Fe-$N_x$ centers (FIG. 17) increases the overall activity toward oxygen reduction. Importantly, no correlation between the activity and concentrations of the above mentioned species was observed in alkaline media (FIGS. 18 and 19). The differences in activity dependence on synthesis parameters in acid and alkaline media (FIGS. 7-12) are also manifested by the surface compositional properties. This phenomenon can be comprehended due to the fact that the mechanisms of oxygen reduction in alkaline and acid media are different. In an alkaline environment, the electron transfer reaction mechanism of oxygen reduction is of the outer-sphere type in contrast to acid media, where the electron transfer reaction mechanism of oxygen reduction is of the inner-sphere type [22]. A surface-independent outer-sphere electron transfer is facilitated by the larger amounts of hydroxyl groups rather than immediate participation of active centers such as N pyridinic and N coordinated to iron, as manifested by structure-to-property correlations in acid. In both media, the flux of $H_2O_2$ does not depend on the amount of both types of species relevant for good activity, i.e. pyridinic N and Fe—$N_x$. Both pyrrolic and quaternary nitrogen catalyze the 1st step of oxygen reduction to peroxide, and this correlation is stronger in acid media in comparison to alkaline media, confirming the irrelevance of chemical properties of the active sites for outer sphere electron transfer in alkaline media.

Figure 20:
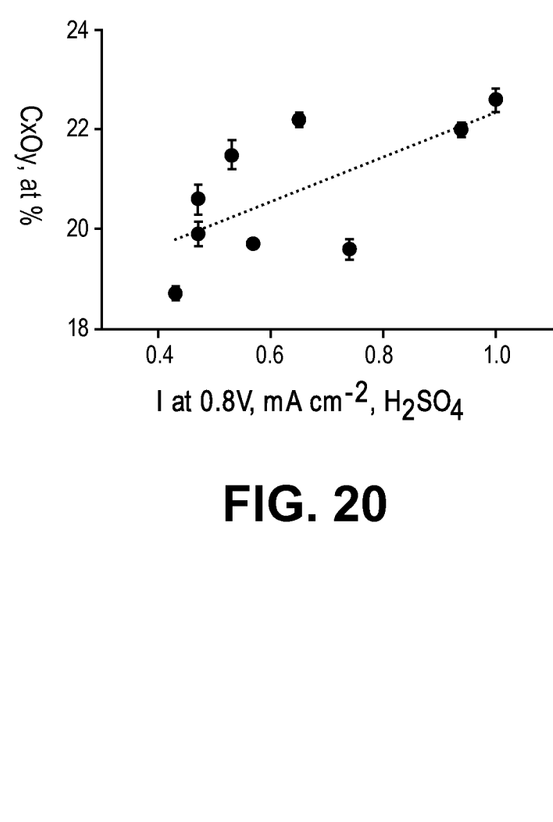
FIG. 20 shows the correlation between surface oxides ($C_xO_y$) and current density at 0.8 V in acid media.
Figure 21:
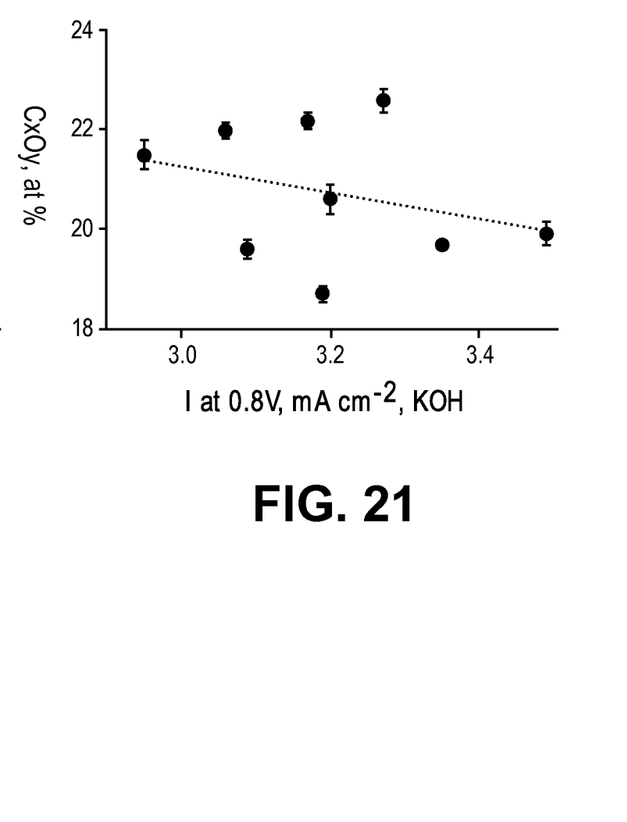
FIG. 21 shows the correlation between surface oxides ($C_xO_y$) and current density at 0.8 V in alkaline media.

Another new very crucial observation we report for the first time is that ORR activity in acid correlates with the amount of surface oxides, i.e. total amount of $C_xO_y$ species such as C—OH, C—OC, C=O and COOH, as determined from high resolution C is spectra (FIG. 20). It should be noted that the presence of surface oxides is an indication of defects in graphene sheets. These defects can be stabilized in the air atmosphere by introducing oxygen atoms. An increase in the numbers of defects, as is indicated indirectly by the higher amounts of $C_xO_y$ on the surface, leads to an increase in oxygen reduction activity. However, there is no correlation of ORR activity with surface moieties in the case of alkaline media (FIG. 21). Due to the fact that there is no direct influence of the number of defects on catalytic activity, the active sites for alkaline media don't have to be located within graphene defects, which confirm the difference of the ORR mechanisms in alkaline and acidic media.

Example II

—Synthesis of Fe-Phenanthroline (Fe-Phen) Cathode Catalysts Using Mechanochemical Synthesis and Carbon Support (Soluble Precursor Utilizing Carbon Support)

Fe-Phen catalysts were prepared by the combination of mechanochemical synthesis and carbon supports. First, a calculated amount of carbon (KetjenBlack), Phenanthroline and iron nitrate (Fe(NO$_3$)$_3$*9H$_2$O, Sigma-Aldrich) were premixed in a 250 ml glass beaker. The mixture was then placed into 150 ml agate ball-mill jar with agate balls. The mass ratio of mixture:balls was ~1:1. The powder was then ball-milled at 350 RPMs for 8 h. The ball-milling parameters were: balls diameter—2 mm, mass ratio of precursors to balls—1:1. The ball-milled fine mixture was then subjected to pyrolysis in three different gases: UHP nitrogen, 50 at %. $H_2$ and 5 at %. $NH_3$ (flow rate 100 cc min-1), 20 deg min-1 temperature ramp rate with different pyrolysis time. The experimental variable component of HT temperatures was of 900° C., 950° C. and 1000° C.

Example III

—Synthesis of Fe-Polyacrylonitrile (Fe-PAN) Cathode Catalysts Using Mechanochemical Synthesis and Carbon Support (Insoluble Precursor Utilizing Carbon Support)

Fe-PAN catalysts were prepared by the combination of mechanochemical synthesis and carbon supports. First, a calculated amount of carbon (KetjenBlack), Polyacrylonitrile and iron nitrate (Fe(NO3)3*9H2O, Sigma-Aldrich) were premixed in a 250 ml glass beaker. The mixture was then placed into 150 ml agate ball-mill jar with agate balls. The mass ratio of mixture:balls was ~1:3. The powder was then ball-milled at 600 RPMs for 1 h. The ball-milling parameters were: balls diameter—2 mm, mass ratio of precursors to balls—1:1. The ball-milled fine mixture was then subjected to pyrolysis in three different gases: UHP nitrogen, 50 at %. H2 and 5 at %. NH3 (flow rate 100 cc min-1), 20 deg min-1 temperature ramp rate with different pyrolysis time. The experimental variable component of HT temperatures was of 900° C., 950° C. and 1000° C.

Example IV

—Synthesis of Fe-Polyacrylamide (Fe-PAAM) Cathode Catalysts Using Mechanochemical Synthesis and Sacrificial Supports (Insoluble Precursor Utilizing Sacrificial Support)

Fe-PAAM catalysts were prepared by the combination of mechanochemical synthesis and sacrificial supports. First, a calculated amount of silica (Cab-O-Sil® M5P), Polyacrylamide and iron nitrate ($Fe(NO_3)_3 * 9H_2O$, Sigma-Aldrich) were premixed in a 150 ml glass beaker. The mixture was then placed into 500 ml agate ball-mill jar with agate balls. The mass ratio of mixture:balls was ~1:2. The powder was then ball-milled at 300 RPMs for 12 h. The ball-milling parameters were: balls diameter—8 mm, mass ratio of precursors to balls—1:1. The ball-milled fine mixture was then subjected to pyrolysis in three different gases: UHP nitrogen, 50 at %. $H_2$ and 5 at %. $NH_3$ (flow rate 100 cc $min^{-1}$), 20 deg $min^{-1}$ temperature ramp rate with different pyrolysis time. The experimental variable component of HT temperatures was of 900° C., 950° C. and 1000° C. After heat treatment, the silica was leached away by means of 25 wt. % HF overnight. Finally, Fe-DAAPyr was washed with DI water until neutral pH and dried at T=85° C.

What is claimed is:

1. A method for forming a catalytic material comprising:
    providing transition metal, nitrogen, and carbon (M-N—C) precursors;
    ball milling the precursors under suitable conditions to initiate polymerization of the precursors, thereby producing a polymer; and
    heat treating the polymer under sufficient conditions to produce metal active sites in the polymer, thereby producing a catalytic material.

2. The method of claim 1 wherein the nitrogen precursor contains at least 4 nitrogen atoms per atom.

3. The method of claim 1 wherein the carbon precursor contains at least 5 carbon atoms per molecule.

4. The method of claim 1 wherein the metal precursor contains iron.

5. The method of claim 1 wherein the heat treatment is conducted at a temperature above 750° C.

6. The method of claim 1 wherein the heat treatment is conducted at a temperature above 825° C.

7. The method of claim 1 wherein the heat treatment is conducted at a temperature above 900° C.

8. The method of claim 1 further comprising providing a support with the M-N—C precursors so as to allow the M-N—C precursors to polymerize around the support.

9. The method of claim 8 wherein the support is a sacrificial support.

10. The method of claim 9 further comprising removing the sacrificial support after heat treatment, to produce a self-supporting porous catalytic material.

11. A catalytic material formed using the method of claim 10.

12. A catalytic material formed using the method of claim 9.

13. A catalytic material formed using the method of claim 8.

14. The method of claim 1 wherein the M-N—C precursors are insoluble.

15. A catalytic material formed using the method of claim 1.

16. The method of claim 1 performed in the absence of solvents.

17. An insoluble catalytic material comprising a metal and carbon derived from an insoluble organic carbon precursor.

18. The catalytic material of claim 17 wherein the insoluble catalytic material is supported by a carbon support.

19. The catalytic material of claim 17 wherein the insoluble catalytic material is porous.

20. The catalytic material of claim 19 wherein the porous insoluble catalytic material is self-supported.

21. The catalytic material of claim 20 wherein the carbon is derived entirely from the organic carbon precursor.

* * * * *